United States Patent [19]

Szoke

[11] Patent Number: 4,669,244

[45] Date of Patent: Jun. 2, 1987

[54] FIRE STOP

[76] Inventor: Bela B. Szoke, 585 East 47th Avenue, Vancouver, British Columbia, Canada, V5W 2B5

[21] Appl. No.: 896,600

[22] Filed: Aug. 13, 1986

[51] Int. Cl.$^4$ ............................................. E04F 17/08
[52] U.S. Cl. ........................................ 52/220; 52/317; 285/192
[58] Field of Search .................. 52/220, 317, 221; 285/47, 61, 64, 192

[56] References Cited

U.S. PATENT DOCUMENTS

| 3,087,514 | 4/1963 | Highsmith | 52/220 X |
| 3,591,190 | 7/1971 | Winay | 52/220 X |
| 3,731,448 | 5/1973 | Leo | 52/220 X |
| 4,071,267 | 1/1978 | Davis | 52/220 X |
| 4,086,736 | 5/1978 | Landrigan | 52/221 |
| 4,270,775 | 6/1981 | Nuensie et al. | 282/192 X |
| 4,304,297 | 12/1981 | Margraf | 285/192 X |
| 4,337,603 | 7/1982 | Davidson | 285/192 X |
| 4,431,198 | 2/1984 | Beinhaur et al. | 285/221 X |
| 4,607,469 | 8/1986 | Harrison | 52/220 |

FOREIGN PATENT DOCUMENTS

| 2901268 | 4/1980 | Fed. Rep. of Germany | 52/220 |
| 3005504 | 8/1981 | Fed. Rep. of Germany | 52/317 |
| 3240474 | 5/1984 | Fed. Rep. of Germany | 52/317 |

Primary Examiner—J. Karl Bell
Attorney, Agent, or Firm—Christie, Parker & Hale

[57] ABSTRACT

A seal for an opening to receive a pipe. The seal has tubular body members, one receivable within the other. The tubular body members form a container for an insulating material. There are end caps for each body member and each end cap has spaced inner and outer end walls and a central opening. A sealing ring is slidably fitted between the end walls of each end cap. The sealing ring is a close fit on the exterior of the pipe. The end caps are able to locate on the tubular body member.

10 Claims, 5 Drawing Figures

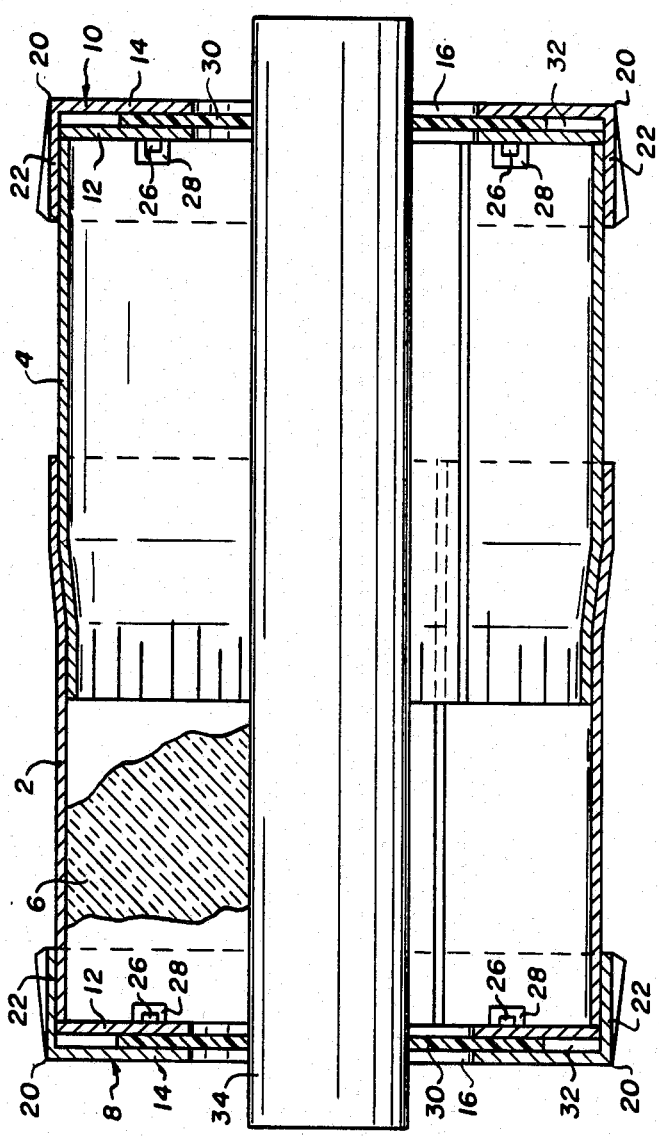

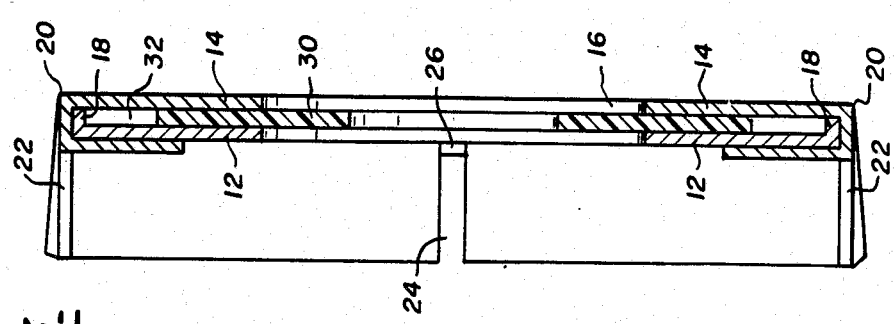
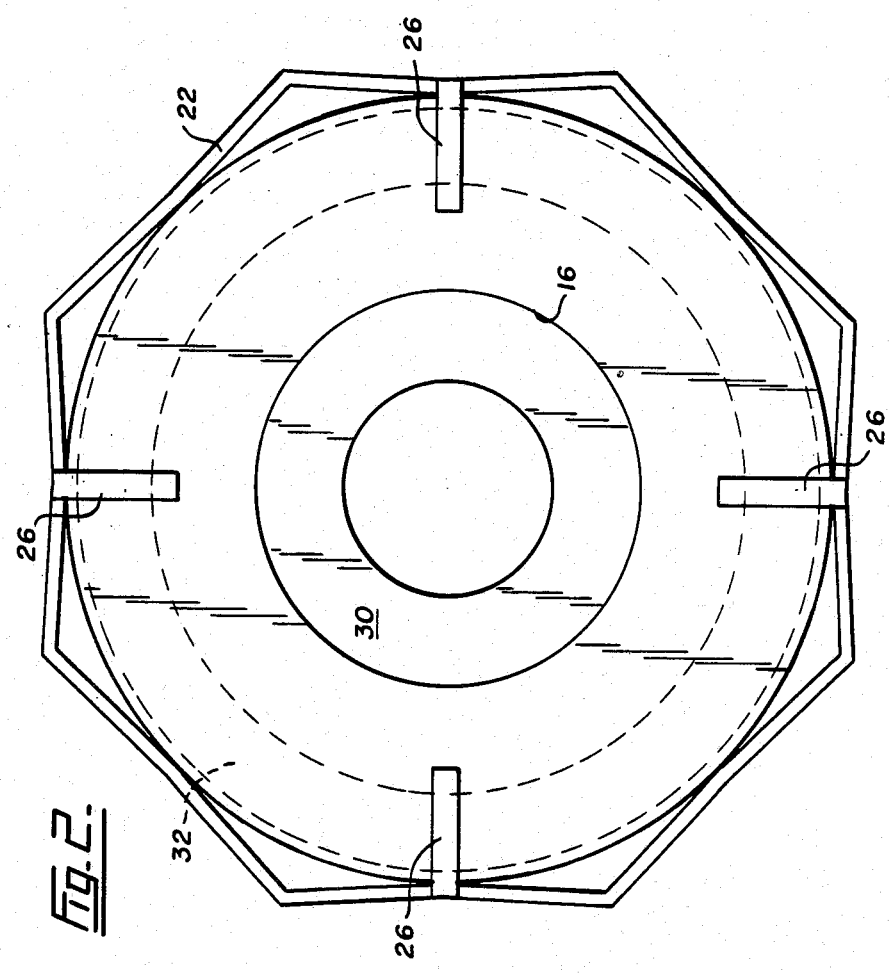

FIRE STOP

FIELD OF THE INVENTION

This invention relates to a seal.

DESCRIPTION OF THE PRIOR ART

In construction it is, of course necessary that pipes carrying water and waste pipes pass between adjacent rooms, that is through the walls of the building. In a multi-story concrete building, the preferred construction for commercial buildings at the present, holes are either drilled through the walls or prefabricated by arranging the frame construction to leave the openings.

Unfortunately the existing sealing of the walls, subsequent to their formation and subsequent to the placing of a pipe through them, is inadequate. These openings provide a principal means of spreading fire and smoke through a building in the event of fire.

It has been proposed to fill the holes with concrete, that is to pack concrete round the pipes after the pipes have been inserted. A further procedure is to pour concrete around the pipes with a small clearance and then caulk the gap with fire-resistant material.

Although each approach has worked in the past there are disadvantages. The first type fails when there is an intense fire burning and, of course, the caulking can burn in the second method. Furthermore neither method allows for expansion, contraction and vibration of the pipes.

SUMMARY OF THE INVENTION

The present invention seeks to provide a seal of simple structure but effective in overcoming the disadvantages of the prior art. Accordingly the present invention is a seal for an opening to receive a pipe, the seal comprising a first tubular body member; a second tubular body member, receivable within the first; the tubular body members cooperating to form a container for an insulating material; a first end cap for the first body member; a second end cap for the second body member; both end caps having spaced end walls defining a central opening; a sealing ring slidably fitted between the end walls of each end cap, the sealing rings being a close fit on the exterior of the pipe; means formed in the end caps to allow location of the end caps on the tubular body member.

DRAWINGS

Aspects of the invention are illustrated, merely by way of example, in the accompanying drawings in which:

FIG. 1 is a section through a seal according to the present invention;

FIG. 2 is an end view of the seal of FIG. 1, from the inside of the seal;

FIG. 3 illustrates an end cap useful in the seal of the present invention;

FIGS. 4 and 5 show variations of the end caps useful in the seal of the present invention.

DESCRIPTION OF THE PREFERRED EMBODIMENTS

The drawings show a seal for an opening to receive a pipe. The seal comprises a first tubular body member 2 and a second tubular body member 4 that is receivable within the first. These tubular body members 2 and 4 cooperate to form a container for an insulating material 6. There is a first end cap 8 for the first body member 2 and a second end cap 10 for the second body member 4. As illustrated in the drawings the end caps 8 and 10 have spaced end walls comprising inner walls 12 and outer walls 14 respectively and a central opening 16. The inner end walls 12 simply comprise flat, circular sheets abutting the ends of the tubular body member 2 or 4. In the FIG. 3 embodiment the inner end wall 12 has a flange 18 to assist in location.

The outer end walls 14 comprise the main structure of the end caps 8 and 10. Only one end cap is shown in FIGS. 3, 4 and 5 but both end caps are the same for each end of the seal. The cap 10 has a flat outer end wall 14 folded over at 20 to form a skirt 22 that grips the tubular body member 4.

As shown in FIG. 3 slots 24 are formed in the outer walls 14. The resulting tab 26 is then bent round and folded back on the inner wall 12 to grip that wall and locate it. Also, as shown particularly in FIG. 1, the tubular body members 2 and 4 are formed with slots 28 at their ends. These slots 28 receive the folded tabs 26 to prevent clearance being present between the end caps 8 and 10 and the ends of tubular body members 2 and 4. There is a sealing ring 30 slidably fitted between the end walls 12 and 14 of each end cap 8 and 10. The sealing rings 30 are a close fit on the exterior of the pipe that is to be sealed in position. It should be noted, for example, from FIGS. 3, 4 and 5 that the recess 32, formed between the end walls 12 and 14 of the end caps 8 and 10 and the dimensions of the sealing ring 30 are arranged so that even if the sealing ring 30 is slid over in the recess 32 as far as possible one way the diametrically opposed periphery of the sealing ring 30 will still be within the recess 32 on the other side of the periphery. This ensures that no matter what position the sealing ring 30 is in the recess it will always seal opening 16. That is the sealing ring 32 always prevents communication between the exterior and the interior of the seal. It should be noted that to allow sealing ring 30 to be compressed slightly flange 18 should be shorter than the thickness of ring 30.

The sealing ring 30 may be of metal or teflon as polytetrafluoroethylene (PTFE).

The insulating material 6 may be any known material, mineral wool is particularly useful, for example as available under the trade mark Energlas.

As shown in FIG. 2 the external configuration of the end caps 8 and 10 is such that the seal can be located in concrete and, when located will not fall out. The illustrated view is of an end cap generally hexagonal.

The pipe 34 shown in FIG. 1 is typically a cardboard pipe or the like, lightweight material, that is present to prevent movement of the insulating material 6 prior to installation of the pipe to be sealed. The pipe 34 is displaced by inserting the final pipe, whether it be a plumbing, waste or gas pipe, when the sealing unit is installed.

The seal may be located in place in a frame construction by locating a sheet of wire mesh with an opening to receive the seal over the opening in the wall and sliding the body member into position. The mesh is stapled in position and cement or plaster is then applied around the seal, over the wire mesh, to locate the seal.

The present invention thus provides a seal that is cheap to manufacture yet effective in operation. The material used is such that the device does not deteriorate in the presence of fire and thus will not permit fire or smoke transmission. It also provides a sound barrier and a very efficient insulator against heat transfer.

I claim:

1. A seal for an opening to receive a pipe, the seal comprising:
   a first tubular body member;
   a second tubular body member, receivable within the first;
   the tubular body members cooperating to form a container for an insulating material;
   a first end cap for the first body member;
   a second end cap for the second body member;
   each end cap having spaced inner and outer end walls and a central opening;
   a sealing ring slidably fitted between the end walls of each end cap, the sealing ring being a close fit on the exterior of the pipe;
   means formed in the end caps to allow location of the end caps on the tubular body member.

2. A seal as claimed in claim 1 in which each ring is dimensioned to slide between the end walls of an end cap, in contact with the pipe, without permitting communication between the exterior and the interior of the seal.

3. A seal as claimed in claim 1 in which the rings are of polytetrafluoroethylene.

4. A seal as claimed in claim 1 in which the rings are of metal.

5. A seal as claimed in claim 1 in which the insulating material is mineral wool.

6. A seal as claimed in claim 1 in which the means to hold the cap on the body member comprises skirts on the end cap to engage the body member.

7. A seal as claimed in claim 1 in which tabs are cut from the outer end wall and folded back to engage the inner end wall to locate the inner end wall.

8. A seal as claimed in claim 7 in which cut outs are provided in the tubular body members to prevent the tabs acting to space the end caps from the ends of the body members.

9. A seal as claimed in claim 1 of an external configuration able to be gripped in concrete.

10. A seal as claimed in claim 9 in which the external shape of the end caps is generally octagonal to prevent removal once molded into concrete.

* * * * *